(12) United States Patent
Fisher

(10) Patent No.: US 7,312,600 B1
(45) Date of Patent: Dec. 25, 2007

(54) AC POWER REGULATOR CIRCUIT

(76) Inventor: Robert Fisher, 8383 Jade Coast Dr., San Diego, CA (US) 92126

( * ) Notice: Subject to any disclaimer, the term of this patent is extended or adjusted under 35 U.S.C. 154(b) by 90 days.

(21) Appl. No.: 11/403,405

(22) Filed: Apr. 12, 2006

(51) Int. Cl.
*G05F 1/40* (2006.01)
*G05F 1/70* (2006.01)
*H02H 7/00* (2006.01)

(52) U.S. Cl. ................................ 323/282; 323/207
(58) Field of Classification Search ........... 323/205, 323/207, 222, 223, 225, 265, 268, 271, 282, 323/285, 290, 299, 301
See application file for complete search history.

(56) References Cited

U.S. PATENT DOCUMENTS

| | | | | |
|---|---|---|---|---|
| 5,461,301 A | * | 10/1995 | Truong | ............ 323/207 |
| 5,495,164 A | * | 2/1996 | Heng | ............ 323/222 |
| 5,619,405 A | * | 4/1997 | Kammiller et al. | ........... 363/80 |
| 5,684,686 A | * | 11/1997 | Reddy | ............ 363/97 |
| 6,664,769 B1 | | 12/2003 | Haas | |
| 7,119,543 B2 | * | 10/2006 | Albrecht et al. | ............ 324/322 |

* cited by examiner

*Primary Examiner*—Matthew V. Nguyen
(74) *Attorney, Agent, or Firm*—LaValle D. Ptak

(57) ABSTRACT

An electronic control system regulates and stabilizes AC line voltage to produce a constant AC voltage output. A switch-mode regulator circuit is employed in conjunction with a variable amplitude regulator to combine a feed-forward control with a variable amplitude regulator interface to achieve continuous real time response.

9 Claims, 6 Drawing Sheets

AC POWER REGULATOR CIRCUIT

BACKGROUND

Alternating current (AC) power provided by commercial electric utility generators frequently is subject to random disturbances and "brown outs". These events can cause malfunctions in electrical equipment operating from AC line voltage, such as the standard 50/60 Hz power provided in the United States.

AC line voltage regulator devices are used as a buffer between the utility AC power line and sensitive electrical equipment to eliminate or reduce voltage variations in the power supplied to such electrical equipment. Conventional AC line voltage regulator devices differ in design and operation. Some devices offer an AC inverter output stage with amplitude and frequency adjustments. Other AC regulators use a Ferro-resonant transformer with an inductive capacitive (LC) tank (SOLA) to maintain a relatively stable output at a fixed line frequency without adjustment. Other devices use variable auto-transformers and a motor drive to adjust the voltage amplitude compensating for variations in the AC line voltage. This latter is a voltage boost device, which incorporates a transformer with a tapped winding and switches for changing the turns ratio, which can increase or decrease the variable line voltage.

While the existing line voltage regulator devices do provide a functional service in many applications, relatively high cost, large size and weight, along with performance shortcomings exist. It is desirable to provide an improved AC regulator circuit which overcomes the shortcomings of the currently available AC line voltage regulator devices.

DETAILED DESCRIPTION

Reference now should be made to the drawings, in which the same reference numbers are used throughout the different figures to designate the same or similar components. The AC power regulator circuit shown in FIGS. 1, 2, 3 and 5 operates to provide AC power control and regulation employing variable amplitude regulation to combine a simple AC signal interface with an AC power stage incorporating a switch-mode regulator.

Figure 1:
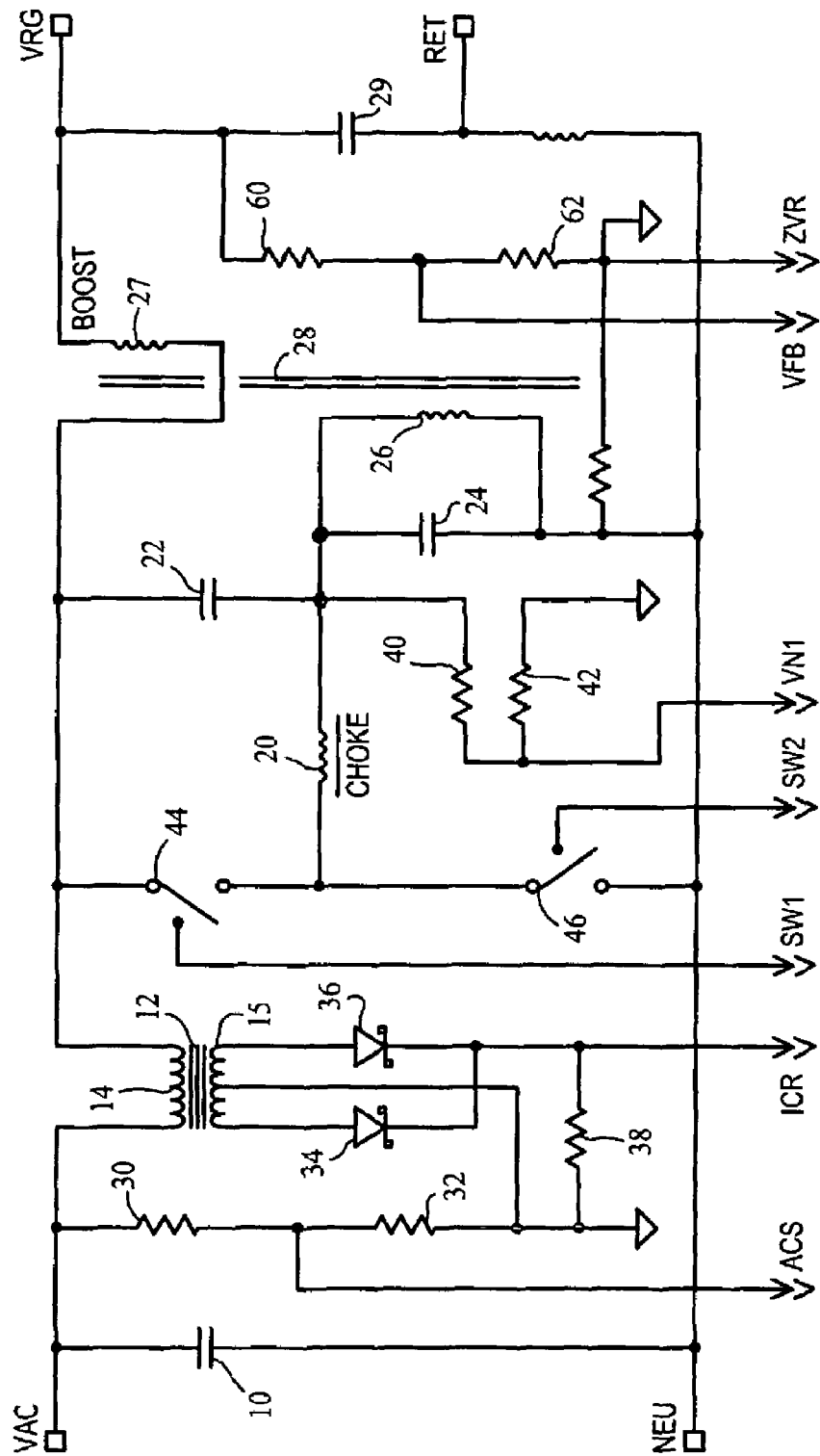
FIGS. 1, 2 and 3 are circuit diagrams of three embodiments of switch-mode regulator circuits used in the invention.
Figure 2:
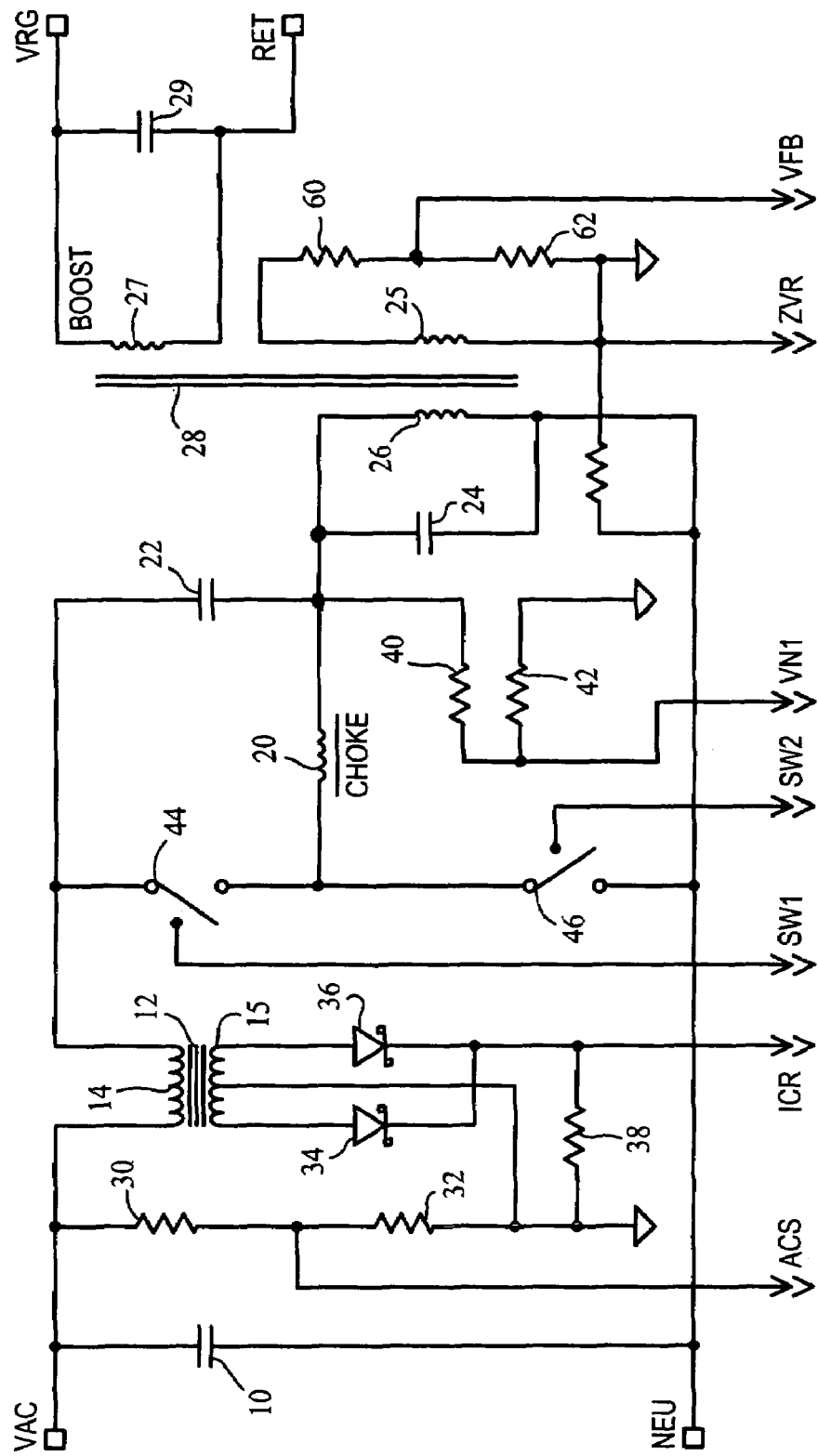

FIGS. 1 and 2 illustrate two different circuit diagrams of a switch-mode regulator which are similar in most respects. The power stage of FIG. 1 is designed to provide a non-isolated AC output, whereas the power stage illustrated in FIG. 2 provides an isolated AC output. Otherwise, the operational characteristics of these two circuits are similar; and consequently, the same control signal interface may be used for output regulation in both of them.

FIGS. 1 and 2 both illustrate the operating features of a switch-mode regulator circuit, but disclose the switching operation in a diagrammatic form in order to provide a general understanding of the system operation, and to more clearly illustrate the difference between the isolated and non-isolated outputs, respectively, of the circuits shown in FIGS. 1 and 2.

As mentioned above, FIGS. 1 and 2 are directed to switch-mode regulator circuits which are substantially the same, with the exception that the circuit of FIG. 1 provides a non-isolated AC output, while the power stage of the circuit of FIG. 2 provides an isolated AC output. Both of these circuits are diagrammatic representations of circuits designed to accept AC line voltage at a terminal VAC and a neutral line connection at terminal NEU. Both circuits deliver regulated AC voltage between output terminals VRG and RET.

A capacitor 10 is connected between the input terminals VAC and NEU to support instantaneous current flow during switch transitions of the switch-mode regulator circuits shown in FIGS. 1 and 2. Terminal VAC also is connected to the primary winding 14 of a transformer 12 to supply signals to a current sense winding 15 of the transformer 12. The winding 15 is connected to a bridge rectifier consisting of diodes 34 and 36. These diodes provide a rectified current signal, which passes through a resistor 38 as a rectified AC input current signal (ICR). This output (ICR) is shown at the bottom of FIGS. 1 and 2, along with other output connections from the switch-mode regulator circuits of these figures to the control circuit of FIG. 5, described subsequently.

The signal ICR is a voltage signal, which is proportional to the current flow in the power stage of the system. A resistor divider consisting of the resistors 40 and 42 is connected across the primary winding 26 of an output transformer 28 in series with a capacitor 22 to generate a signal VN1, which is proportional to the induced voltage in the winding 26 of the transformer 28.

Figure 5:
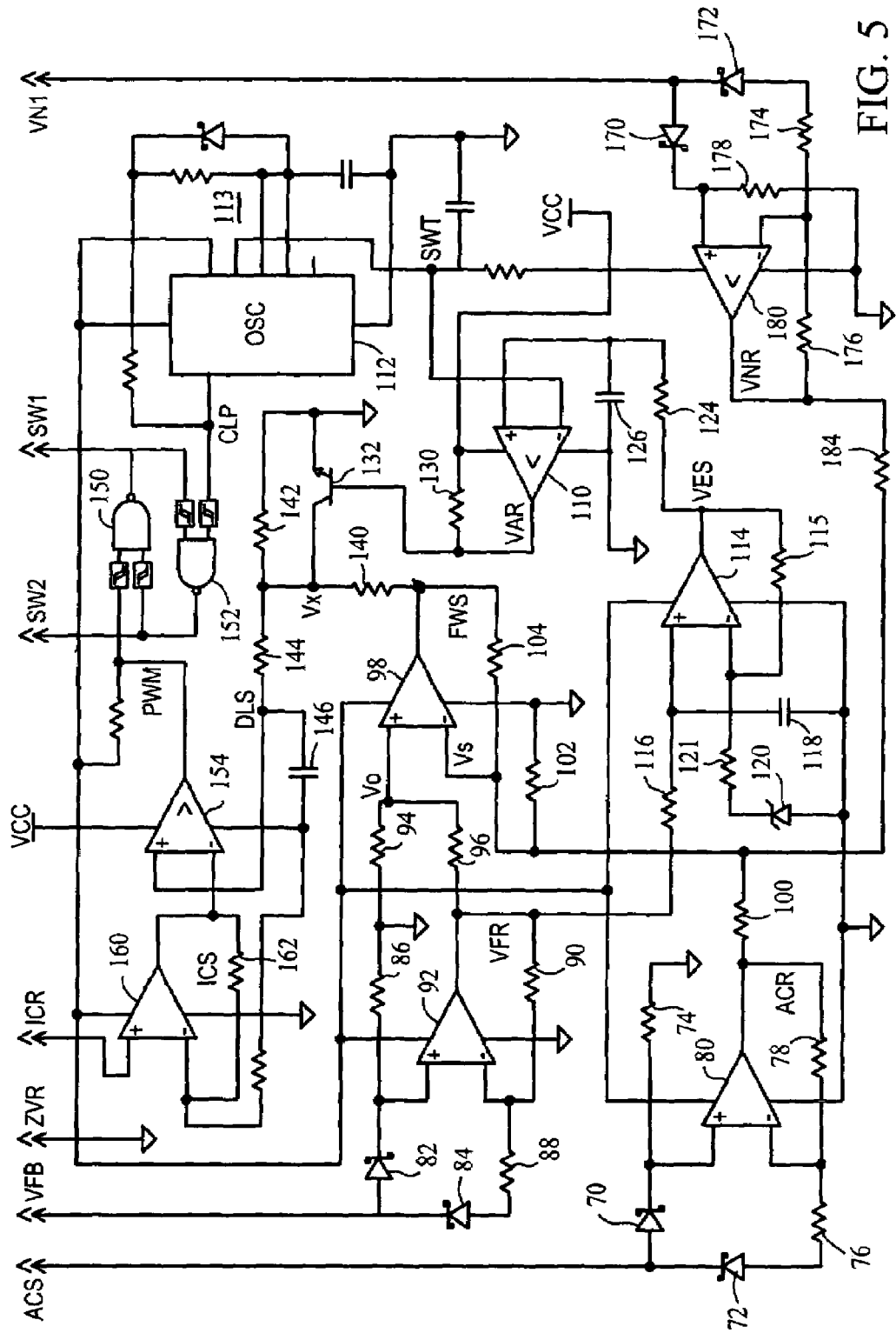
FIG. 5 is a circuit diagram of additional portions of an embodiment of the invention.

In the operation of the circuits of FIGS. 1 and 2, as effected by the control circuit of FIG. 5, switches 44 and 46 control current flow through a choke 20 connected in series with the winding 26 of the output transformer 28. The switching is effected in accordance with the variations of the voltage at the input terminal VAC. When the voltage at terminal VAC is positive with respect to NEU, and the switch 44 is closed or turned on, current flows from the terminal VAC to the primary winding 14 of the transformer 12, through the choke 20 and the primary winding 26 of the output transformer 28 to terminal NEU. When the voltage at the terminal VAC is negative with respect to NEU and switch 44 is closed or turned on, the current flow is reversed. Therefore, switch 44 controls the AC input current flow during either polarity of the AC input voltage cycle on the terminal VAC. When the switch 44 is closed or turned on, the switch 46 must be open or turned off. However, when the switch 44 is opened, the switch 46 must be turned on immediately to provide a path for the stored energy in the choke 20 to pass current through the winding 26 of the transformer 28. Controlling the on-off duty cycle between the switches 44 and 46 is the means by which the output voltage and current are regulated in this system. Operation of the switches 44 and 46 is effected by the control circuit of FIG. 5, which is described in greater detail subsequently.

In FIG. 1, a non-isolated output to the terminals VRG and RET is provided by means of the circuit interconnections of the primary winding 26 and the booster winding 27 of the transformer 28, as illustrated. Whenever the output voltage amplitude decreases, the output voltage at the terminal VRG is maintained by a boost induced by the AC current flow through the winding 26 of the transformer 28, as applied to the boost winding 27. A divider consisting of a pair of resistors 60 and 62 connected across the terminal VRG and ground produces an AC voltage output signal (VFB), as shown in both FIGS. 1 and 2. A capacitor 29 is connected across the terminals VRG and RET to function as a ripple filter.

FIG. 2 differs from FIG. 1 in the manner in which the output transformer 28 is configured. As is readily apparent from an examination of FIG. 2 and comparison with FIG. 1, FIG. 2 isolates the output terminals VRG and RET from the input terminals VAC and NEU. This is accomplished by providing the boost winding 27 as a separate independent winding, and providing a secondary winding 25 to supply the representative AC output voltage signal VFB across the resistor divider 60, 62. The turns ratio between the windings 25, 26, 26 and 27 determines the specific output voltage range of the circuit. With the exception of the difference in the interconnections of the output transformer 28, the circuits of FIGS. 1 and 2 are the same.

Figure 3:
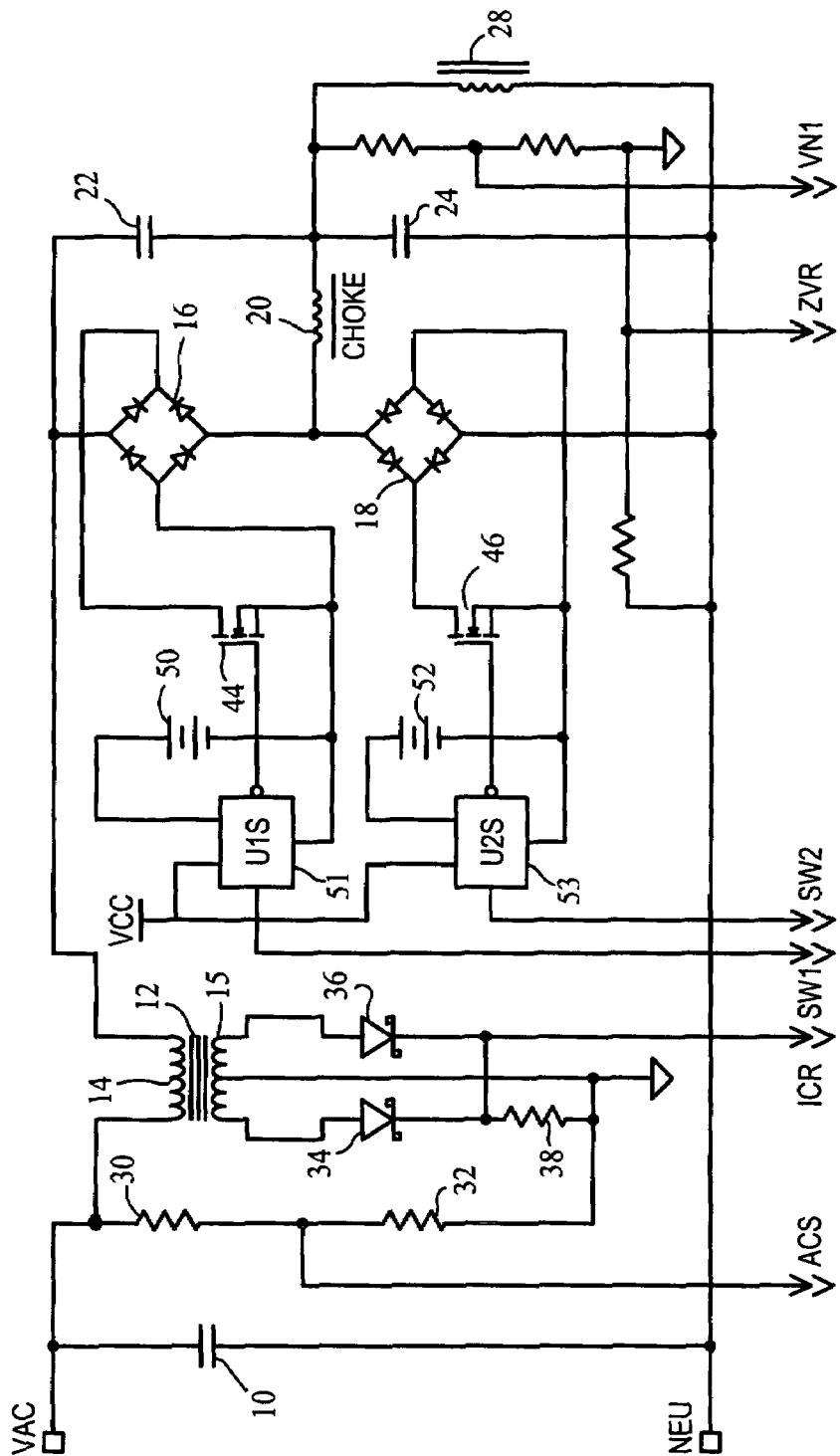

FIG. 3 is a more detailed circuit diagram showing an actual implementation of electronic switches for the switches 44 and 46, which have been diagrammatically represented in FIGS. 1 and 2. The portions of the circuit of FIG. 3 which operate in the same manner as the portions of the circuit shown in FIG. 1 are provided with the same reference numbers, and function in the same manner as described above in conjunction with FIG. 1. FIG. 3, however, shows the use of a pair of MOS FET transistors 44 and 46 operating as the switches diagrammatically depicted as the switches 44 and 46 of FIG. 2. A fixed frequency digital oscillator (FIG. 5, to be described) is used to generate control pulses for the gates of the transistors 44 and 46 in the regulator circuit of FIG. 3. In the circuit of FIG. 3, the terminal VAC is connected through the winding 14 of the transformer 12 to one of the inputs of a full wave bridge rectifier 16. The other input of the rectifier 16 is connected to one of the two inputs of a second full wave bridge rectifier 18, the other input terminal to which is connected to the terminal NEU. The interconnection between the rectifiers 16 and 18 is connected to the choke 20. The other terminal of the choke 20 is connected to the junction of the capacitors 22 and 24, in the same manner described above in conjunction with FIGS. 1 and 2. Thus, a path for AC current flow is provided.

The bridge rectifiers 16 and 18 operate as an interface between the MOSFET transistor switches 44 and 46 and the AC power line VAC. As described previously in conjunction with, the diagrammatic representation of the switches 44 and 46, when VAC is positive with respect to NEU and the transistor 44 is turned on, current flows from VAC through the winding 14 of the transformer 12, the full wave rectifier 16, and the primary winding of the output transformer 28 to the terminal NEU. When the voltage on the terminal VAC is negative with respect to that on NEU, and transistor 44 is turned on, the current flow is reversed; but the path remains the same.

When the transistor 44 is turned on, the transistor 46 must be turned off. When the transistor 44 is being turned off, however, the transistor 46 must be turned on immediately to provide a path for the stored energy in the choke 20 to pass through the primary winding of the transformer 28. As mentioned above in conjunction with FIGS. 1 and 2, controlling the on-off duty ratio between the operation of the transistor switches 44 and 46 is the means by which the output voltage and current are regulated.

Figure 4:
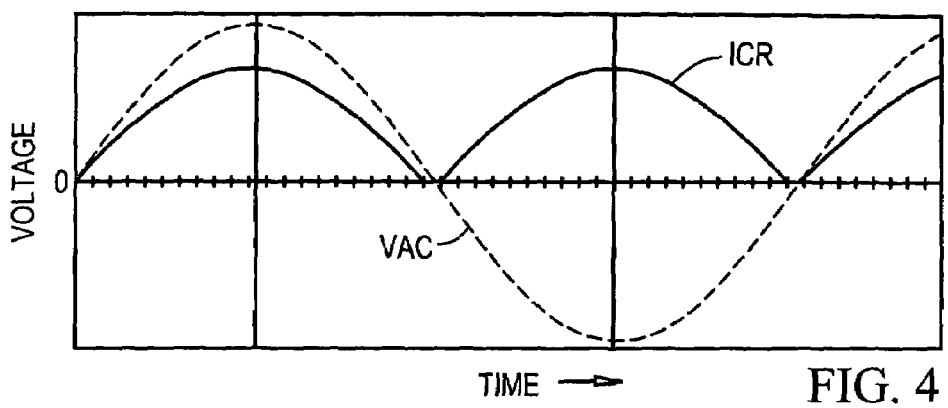
FIG. 4 shows wave-forms produced with portions of the circuits of FIGS. 1, 2 and 3.

Signal compatibility and a common ground or zero voltage reference (ZVR) is required between the switch-mode regulator circuit of FIGS. 1, 2 or 3 and the control circuit of FIG. 5. The control circuit of FIG. 5 is designed to combine analog and digital control functions into a common circuit configuration. A common logic supply (VCC) is used to operate all control circuit elements. The AC voltage monitor signals ACS, VN1, and VFB must be rectified to be compatible with the control functions of the control circuit illustrated in FIG. 5. Typical 60 Hz line frequency waveform simulations (VAC and ICR) are shown in FIG. 4. It also is necessary to isolate the gate drive voltage supplies 50 and 52 (FIG. 3) from the control logic signals SW1 and SW2 within two isolating sub-circuits 51 and 53. As far as the functional operation is concerned, the signals applied on the leads SW1 and SW2, respectively, of FIG. 3 are applied through the isolation circuits 51 and 52 to control the turning on and turning off of the transistors 44 and 46.

Signal flow and functional relationships within the control circuit shown in FIG. 5 are based on a dual feedback loop concept. A fast acting current-mode inner loop and a voltage-mode outer loop with a slower response time are used. The following description of the circuit operation of the control circuit of FIG. 5 provides various signal acronyms and the functional requirements for component values and other characteristics which are related to the circuit operation. For each application, a specific circuit is designed to define the necessary construction and assembly requirements. In the discussion of the operation of the circuit of FIG. 5, the operation specifically is applied to the circuit of FIG. 3. It should be understood, however, that the circuit of FIG. 3 essentially is a specific implementation of the switch-mode circuits of either FIG. 1 or 2.

Before entering into a discussion of the operation of the control circuit of FIG. 5, it should be noted that the circuit of FIG. 3 is shown as ending on the right-hand side thereof, with a signal to the primary winding of the transformer 28. This circuit can be employed with either of the output configurations of FIG. 1 or FIG. 2. The transformer 28 and the primary winding shown in FIG. 3 comprise the same transformer 28 and the same primary winding 26 of both of the different embodiments shown in FIGS. 1 and 2. The connections through the transformer 28 to the terminals VRG and RET of either FIG. 1 or FIG. 2 may be made, employing the respective output circuitry which is shown in either of these figures. Both of them can be used in conjunction with the more specific switch mode circuit which is shown in greater detail in FIG. 3.

In FIG. 5, the ACS signal from FIG. 3 is connected to a pair of diodes 70 and 72, which feed three identical resistors 74, 76 and 78 and provide input and feedback to an amplifier 80. The amplifier 80 generates a rectified signal waveform ACR which is similar to the ICR waveform discussed above in conjunction with FIGS. 1, 2 and 3, and shown in FIG. 4. The AC output signal VFB (shown in FIGS. 1 and 2, but also available from the circuit of FIG. 3) connects to a pair of diodes 82 and 84. The rectified signal from the diodes 82 and 84 is fed to three identical resistors 86, 88 and 90, which provide input and feedback to another amplifier 92. The output of the amplifier 92 is a signal VFR (rectified AC output voltage signal) which connects through a resistor divider 94 and 96 to the (+) input of a differential amplifier 98. The signal ACR feeds through another resistor divider 100 and 102 to the (−) input of the differential amplifier 98.

Assuming ideal amplifier characteristics and ignoring component tolerances, the following equation can be used:

$$FWS = Vo = [(Vs/R102) - (ACR - Vs)/R100 - (VNR - Vs)/R184] \times R104 \qquad (1)$$

Where Vo is the output voltage, Vs the input voltage analog sum and FWS is the feed-forward control signal from the amplifier 98, and R102, R100, R184 and R104 are resistance values of these resistors in FIG. 5. The signal VNR and the location and functions of the resistors 184 and 104 are described subsequently.

The feed forward signal FWS at the output of the amplifier 98 is the sum of three rectified analog AC signals, namely ACR at the output of the amplifier 80, VNR at the output of an amplifier 180 to be described later, and VFR at the output of the amplifier 92. Because the Vo signal voltage is applied as a reference to the (+) input of the differential amplifier 98, the Vs voltage level at the (−) input is maintained equal to Vo by means of the feedback resistor 104 and the internal gain of the amplifier 98. The Vo signal voltage therefore is part of the functional relationship between the signal FWS (feed forward control signal) and voltage at Vs. The signal voltage amplitude of Vo and Vs is defined by the following equation:

$$Vo=[VFR/(R94=R96)XR96]=Vs \qquad (2)$$

Figure 6:
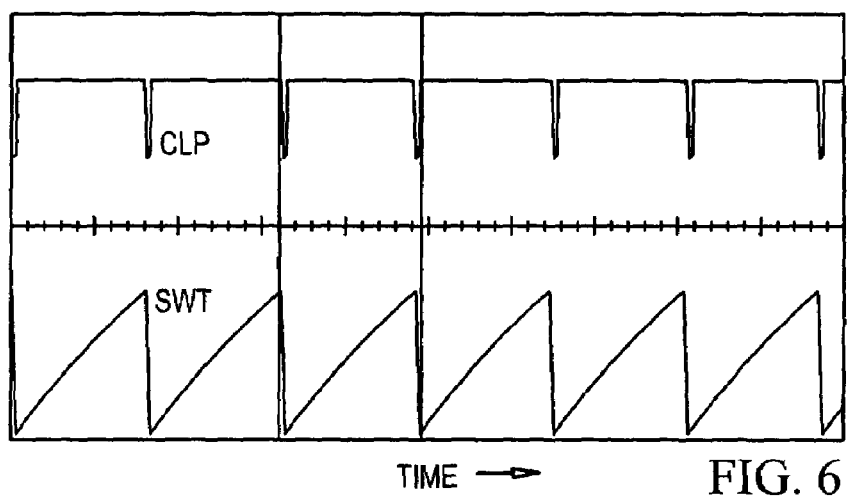
FIGS. 6, 7, 8 and 9 are waveforms useful in explaining the operation of the embodiment shown in FIG. 5.

The FWS and VES signals interact with each other by means of a variable amplitude regulator (VAR) 110, which converts analog voltage levels into a digital duty ratio (DR). A fixed frequency oscillator 112 generates clock pulses (CLP) and a sawtooth waveform (SWT) shown in FIG. 6, as a means for digital signal processing (DSP). Digital signals are used in several areas of the control circuit of FIG. 5, as is readily apparent by the manner in which the various signal connections of the circuits described are made to other components of the control system.

The VES (voltage error signal) is generated at the output of an amplifier 114. The voltage feedback (VFR) from the amplifier 92 connects through an RC filter 116/118 to the (+) input of the differential amplifier 114. The (−) input of the amplifier 114 connects through a resistor 121 to a fixed reference voltage established by a Zener diode 120. The VES output error signal of the amplifier 114 is connected through an RC filter 124/126 to the (+) input of the VAR comparator 110. The (−) input of the VAR comparator connects directly to the sawtooth waveform SWT generated by the oscillator 112. The output of the VAR comparator 110 provides digital pulses which are synchronous with the oscillator frequency (because of the SWT input); and the on-off duty ratio (DR) of these pulses is proportional to the VES voltage level applied to the (+) input of the VAR comparator 110. The output of the comparator 110 is connected directly to a bias resistor 130 and to the base of an NPN transistor 132 to translate the error voltage VES into proportional on-off pulses at the junction of the resistors 140/142/144 connected to the collector of the transistor 132 at the junction Vx. This link, provided by the transistor 132 between the VES and FWS signals, uses the variable amplitude regulator signal (VAR) produced by the comparator 110 to generate a demand level control signal (DLS) at the junction of the resistor 144 and capacitor 146.

In the circuit shown in FIG. 5, the FWS signal from the amplifier 98 connects through the resistor 140 to the junction Vx generating a voltage across the resistor 142, which is in parallel with the collector emitter path of the transistor 132. The voltage signal at Vx is attenuated by the turning on and off of the transistor 132. When the transistor 132 is off or non-conductive, its equivalent resistance value Rmx is very high (on the order of Megaohms), and the effect of Rmx can be ignored.

Figure 7:
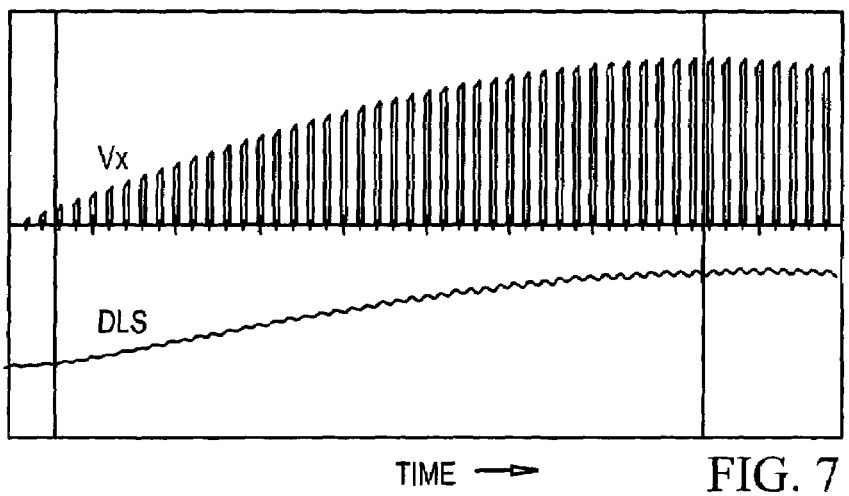

When the transistor 132 is rendered conductive or turned on, its equivalent resistance Rin is only 50 Ohms, which is in parallel with the resistance of the resistor 142, about 10K Ohms. With the transistor 132 turned on, Rin dominates because of its low resistance value, and the effect of resistor 142 can be ignored. The voltage pattern thus generated at the junction Vx is filtered through the resistor 144 and the capacitor 146 to become the demand level signal DLS. Typical waveforms for these signals Vx and DLS are shown in FIG. 7. An algebraic equation defining the relationship between the VES control duty ratio DR, the FWS signal, and the analog DLS current demand level is shown in the equation below:

$$DLS=FWS[(1-DR)R142/(R140+R142)+DRxRin/(R140+Rin)] \qquad (3)$$

Figure 8:
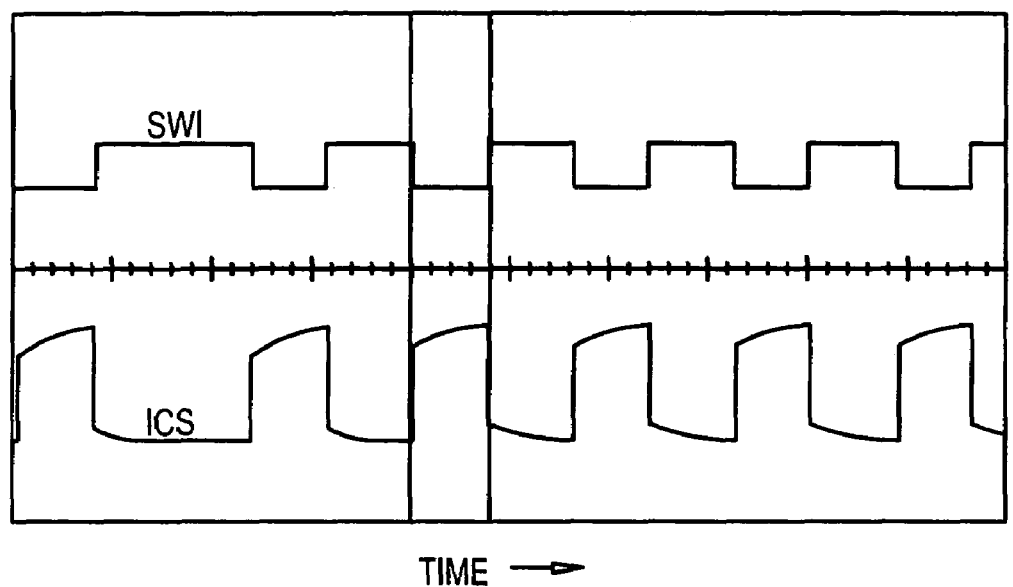
Figure 9:
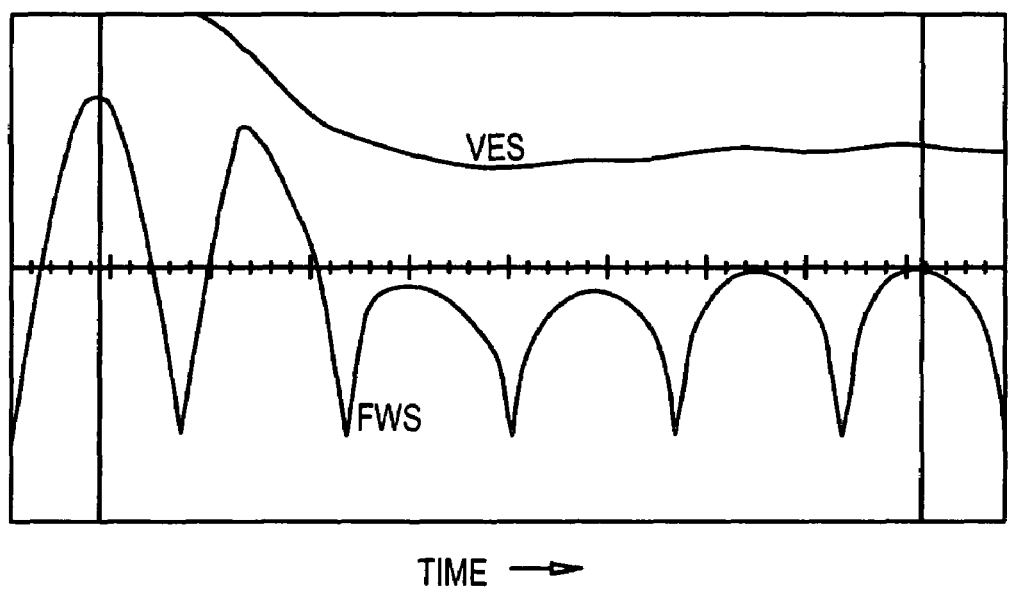

As stated earlier, the AC input current flow is controlled by means of pulse width modulation. In the circuit of FIG. 5, a pair of gates 150 and 152 are cross-coupled to form a latch which generates both digital drive signals SW1 and SW2. The clock pulse CLP sets the output of gate 152 high, which forces the output of gate 150 low, and turns on the MOSFET transistor switch 44 (FIG. 3) on (see FIG. 8), thereby starting AC input current flow in the switch-mode control circuit of FIG. 3. A comparator 154 generates the pulse width modulation PWM signal based on the voltage level of the DLS and ICS signals applied to its inputs. When the ICS signal level increases and becomes greater than the DLS, the PWM signal goes low, which resets the latch forcing the output of the gate 150 high, and that of the gate 152 low. This causes the MOSFET power switch 44 (FIG. 3) to be turned off and the MOSFET power switch 46 (FIG. 3) to be turned on. The latch and the switches 44 and 46 remain in this logic state where the switch 44 is off and the switch 46 is turned on, until the next clock pulse from the oscillator 112 starts another switching cycle.

As is apparent from the foregoing, the various signal levels which occur through variations of VAC relative to NEU (FIG. 3) cause a combination of analog and digital signals to be obtained for varying the pulse width modulation (PWM) signal from the output of the comparator 154 and therefore control the relative on and off times of the MOSFET transistor switches 44 and 46 to maintain a constant voltage level on the output of the switch-mode circuit of FIG. 3, whether the output stage of the circuit of FIG. 1 or FIG. 2 is used. The system enables the control circuit of FIG. 5 to regulate the AC input power factor (PFC) and maintain AC output regulation simultaneously. The power factor control is effected generally in accordance with the principles disclosed in the U.S. Pat. to Haas U.S. Pat. No. 6,982,547, incorporated into and integrated into the control circuit of FIG. 5 to provide this simultaneous operation.

The foregoing description of embodiments of the invention is to be considered as illustrative and not as limiting. Various changes and modifications will occur to those skilled in the art to achieve substantially the same result, in substantially the same way without departing from the true scope of the invention as defined in the appended claims.

What is claimed is:

1. A system for regulating alternating current (AC) power output and regulating alternating current (AC) input power factor including in combination: alternating current (AC) input terminals; alternating current (AC) output terminals; a switch-mode regulator circuit connected between the AC input terminals and the AC output terminals; means responsive to the voltage on the AC output terminals and to the voltage on the AC input terminals for producing a voltage analog sum (Vs); means responsive to the voltage (Vo) on the AC output terminals and to the voltage analog sum (Vs) for producing a feed-forward signal (FWS); a voltage error differential amplifier coupled to the alternating current input terminals and to a reference signal to produce a voltage a voltage error signal (VES); a source of clock pulses; a comparator having a first input coupled to receive the VES and a second input coupled to receive clock pulses from the source of clock pulses to produce a variable amplitude regulator signal (VAR); a switch means connected to receive the VAR and the FWS for generating a demand level control signal (DLS); and means responsive to the DLS for controlling the operation of the switch-mode regulator circuit.

2. A system according to claim 1 wherein the switch-mode regulator circuit has first and second switches connected in series across the alternating current input terminals with a junction between the switches coupled with the alternating current output terminals, wherein the means responsive to the DLS alternately closes and opens the first and second switches with the first switch being closed and the second switch being opened, and vice-versa.

3. A system according to claim 2 wherein the first and second switches comprise first and second electronic switches.

4. A system according to claim 3 wherein the first and second switches are MOSFET transistor switches.

5. A system according to claim 4 wherein the junction between the first and second switches is coupled with the alternating current output terminals through a series connection of a choke and a primary winding of an output transformer.

6. A system according to claim 5 wherein the means responsive to the DLS includes a pulse width modulator further coupled with the alternating current input terminals to vary the operation of the first and second switches.

7. A system according to claim 1 wherein the means responsive to the DLS includes a pulse width modulator further coupled with the alternating current input terminals to vary the operation of the first and second switches.

8. A system according to claim 2 wherein the junction between the first and second switches is coupled with the alternating current output terminals through a series connection of a choke and a primary winding of an output transformer.

9. A system according to claim 8 wherein the means responsive to the DLS includes a pulse width modulator further coupled with the alternating current input terminals to vary the operation of the first and second switches.

* * * * *